US012729002B2

(12) United States Patent
Horner

(10) Patent No.: US 12,729,002 B2
(45) Date of Patent: Sep. 8, 2026

(54) DISTRIBUTED CABIN PRESSURE CONTROL SYSTEM

(71) Applicant: Honeywell International Inc., Charlotte, NC (US)

(72) Inventor: Darrell W. Horner, Oro Valley, AZ (US)

(73) Assignee: Honeywell International Inc., Charlotte, NC (US)

( * ) Notice: Subject to any disclaimer, the term of this patent is extended or adjusted under 35 U.S.C. 154(b) by 154 days.

(21) Appl. No.: 18/475,754

(22) Filed: Sep. 27, 2023

(65) Prior Publication Data

US 2025/0100693 A1 Mar. 27, 2025

(51) Int. Cl.
*B64D 13/04* (2006.01)
*B64D 45/00* (2006.01)
*G05D 16/00* (2006.01)
*G05D 16/20* (2006.01)

(52) U.S. Cl.
CPC ............. *B64D 13/04* (2013.01); *B64D 45/00* (2013.01); *G05D 16/024* (2019.01); *G05D 16/2013* (2013.01)

(58) Field of Classification Search
CPC ...... B64D 13/04; B64D 45/00; G05D 16/024; G05D 16/2013
See application file for complete search history.

(56) References Cited

U.S. PATENT DOCUMENTS 2,307,199 A * 1/1943 Cooper ................ G05D 16/101 137/613
3,376,803 A 4/1968 Emmons
4,553,474 A 11/1985 Wong et al.
(Continued)

FOREIGN PATENT DOCUMENTS

CN 102662904 A * 9/2012
CN 212229452 U * 12/2020
RU 2550887 C2 * 5/2015

OTHER PUBLICATIONS

CN-212229452 Cui original and machine translation (Year: 2020).*
(Continued)

*Primary Examiner* — Kito R Robinson
*Assistant Examiner* — Zachary E. F. Glade
(74) *Attorney, Agent, or Firm* — Shumaker & Sieffert, P.A.

(57) ABSTRACT

A distributed aircraft cabin pressure control system (CPCS), and techniques for interfacing the distributed CPCS to avionics. The CPCS-specific equipment of this disclosure is used in a variety of different type aircraft with no hardware or software change for each aircraft type. In this manner, CPCS-specific equipment is used in different type aircraft without the need for formal re-certification of the CPCS-specific equipment. The CPCS-specific equipment may operate with limited, and fixed, functionality and control algorithms in its hardware and software that would not change from airplane application to application, but it would instead use “gain terms” transmitted from the avionics. The distributed CPCS processes in the various avionics modules
(Continued)

may send information to the CPCS-specific equipment that customizes the operation of the CPCS-specific equipment to that specific aircraft type.

20 Claims, 7 Drawing Sheets

(56) References Cited

U.S. PATENT DOCUMENTS

| | | | | |
|---|---|---|---|---|
| 5,273,486 A * | 12/1993 | Emmons | B64D 13/04 236/78 D |
| 6,676,504 B2 | 1/2004 | Petri et al. | |
| 6,737,988 B2 * | 5/2004 | Horner | B64D 13/04 454/72 |
| 8,694,181 B2 * | 4/2014 | Horner | B64D 13/00 701/3 |
| 9,802,709 B2 | 10/2017 | Huart et al. | |
| 11,603,206 B2 | 3/2023 | Horner et al. | |
| 2006/0025064 A1 * | 2/2006 | Horner | B64D 13/02 454/74 |
| 2007/0049188 A1 | 3/2007 | McCoy | |
| 2007/0102576 A1 | 5/2007 | McCoy et al. | |
| 2011/0017868 A1 | 1/2011 | Arthurs et al. | |
| 2022/0289391 A1 | 9/2022 | Buck et al. | |

OTHER PUBLICATIONS

Li CN-102662904 original and machine translation (Year: 2012).*

Egorov RU-2550887 original and machine translation (Year: 2015).*

Kurokawa et al., “Determination of the Outflow Valve Opening Area of the Aircraft Cabin Pressurization System”, 18th International Congress of Mechanical Engineering, Nov. 6, 2005, 7 pp.

U.S. Appl. No. 18/052,084, filed Nov. 2, 2022, naming inventors Horner et al.

Extended Search Report from counterpart European Application No. 24198811.2 dated Feb. 12, 2025, 7 pp.

Response to Extended Search Report dated Feb. 12, 2025, from counterpart European Application No. 24198811.2 filed Apr. 22, 2025, 54 pp.

Communication pursuant to Article 94(3) EPC from counterpart European Application No. 24198811.2 dated Dec. 17, 2025, 5 pp.

Response to Communication pursuant to Article 94(3) EPC dated Dec. 17, 2025, from counterpart European Application No. 24198811.2 filed Feb. 24, 2026, 12 pp.

* cited by examiner

DISTRIBUTED CABIN PRESSURE CONTROL SYSTEM

TECHNICAL FIELD

The disclosure relates to aircraft cabin air pressure control.

BACKGROUND

Aircraft may have a pressurized cabin to provide comfort and sufficient oxygen to a flight crew as well as passengers. In some examples, bleed air from the aircraft engines, or an engine driven air pump, may provide pressure to the aircraft interior. An outflow valve (OFV) may be used to release pressure from inside the cabin to the atmosphere to keep the internal cabin pressure within a desirable range. Some aircraft are equipped with a cabin pressure control system (CPCS) to maintain the cabin pressure altitude to within a relatively comfortable range (e.g., below approximately 8,000 feet). The CPCS may automatically allow gradual changes in the cabin pressure altitude to keep passengers and crew comfortable and maintain a cabin-to-atmosphere differential pressure below nominal and maximum limits.

SUMMARY

In general, the disclosure describes techniques to re-use cabin pressure control system (CPCS)-specific equipment in different aircraft types with no hardware or software change for the CPCS specific equipment for the different aircraft types. Instead, the avionics for each aircraft type may provide gain terms to the CPCS-specific equipment to customize the operation of the CPCS-specific equipment for that aircraft type. In this manner, the same CPCS-specific equipment may be used in different aircraft types without the need for formal re-certification to RTCA/DO-254 or RTCA/DO-178 and no requalification to RTCA/DO-160-resulting in less recurring development investment costs, as well as more flexibility to customize CPCS operation for each aircraft type.

In some examples, bleed air from turbine engines may be used to pressurize the cabin and air is released from the cabin by an outflow valve. By using a CPCS, e.g., a cabin pressure regulator, to manage the flow of air through the outflow valve, the pressure within the aircraft can be increased or decreased as required. The system of pressurizing and managing the air pressure with the outflow valve may maintain a set differential pressure or a set cabin altitude that may be higher pressure than the pressure outside the aircraft, for crew and/or passenger comfort and safety.

In one example, the disclosure is directed to a system comprising: avionics circuitry configured to be installed on an aircraft; an outflow valve comprising an actuator configured to control a position of the outflow valve, wherein the outflow valve is configured to release pressure from a cabin of the aircraft to atmosphere; a pressure sensor configured to sense air pressure of the cabin; processing circuitry configured to: receive a signal from the pressure sensor comprising cabin pressure of the cabin; receive a position of the outflow valve from an outflow valve position sensor; receive, from the avionics circuitry of the aircraft, a plurality of indications, the indications comprising a phase of flight for the aircraft, a cabin pressure setpoint for the phase of flight, cabin pressure limits for the phase of flight, and a cabin pressure change rate for the phase of flight; receive, from the avionics circuitry, one or more gain terms associated with the phase of flight, wherein the one or more gain terms comprise pressure, rate, actuator speed command, valve position, and one or more of an actuator current loop, actuator commutation loop, dead band limits, or hysteresis limits; and operate the actuator for the outflow valve based on the plurality of indications from the avionics circuitry, the one or more gain terms, the cabin pressure, and the position of the outflow valve. In another example, a system includes.

In another example, the disclosure is directed to a apparatus for distributed cabin pressure control, the apparatus comprising: an outflow valve comprising an actuator configured to control a position of the outflow valve, wherein the outflow valve is configured to release pressure from a cabin of an aircraft to atmosphere; a pressure sensor configured to sense air pressure of the cabin; processing circuitry configured to: receive a signal from the pressure sensor comprising cabin pressure of the cabin; receive a position of the outflow valve from an outflow valve position sensor; receive, from avionics circuitry of the aircraft, a plurality of indications, the indications comprising: a phase of flight for the aircraft, a cabin pressure setpoint for the phase of flight, cabin pressure limits for the phase of flight, and a cabin pressure change rate for the phase of flight; receive, from the avionics circuitry, one or more gain terms associated with the phase of flight, wherein the one or more gain terms comprise: pressure, rate, actuator speed command, valve position, and one or more of an actuator current loop, actuator commutation loop, dead band limits, or hysteresis limits; and operate the actuator for the outflow valve based on the plurality of indications from the avionics circuitry, the one or more gain terms, the cabin pressure and the position of the outflow valve.

In another example, the disclosure is directed to a method comprising: receiving, by processing circuitry of distributed cabin pressure control system (CPCS), a signal from a pressure sensor, the signal comprising an indication of cabin pressure of a cabin of an aircraft; receiving an indication of a position of an outflow valve from an outflow valve position sensor, wherein the outflow valve comprises an actuator configured to control a position of the outflow valve, and wherein the outflow valve is configured to release pressure from the cabin of the aircraft to atmosphere; receiving, from avionics circuitry of the aircraft, a plurality of indications, the indications comprising: a phase of flight for the aircraft, a cabin pressure setpoint for the phase of flight, cabin pressure limits for the phase of flight, and a cabin pressure change rate for the phase of flight; receiving, from the avionics circuitry one or more gain terms associated with the phase of flight, wherein the one or more gain terms comprise one or more of pressure, rate, actuator speed command, valve position, and actuator current loop, actuator commutation loop, dead band limits, or hysteresis limits; and controlling the actuator for the outflow valve based on the plurality of indications from the avionics circuitry, the one or more gain terms, the cabin pressure and position of the outflow valve.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
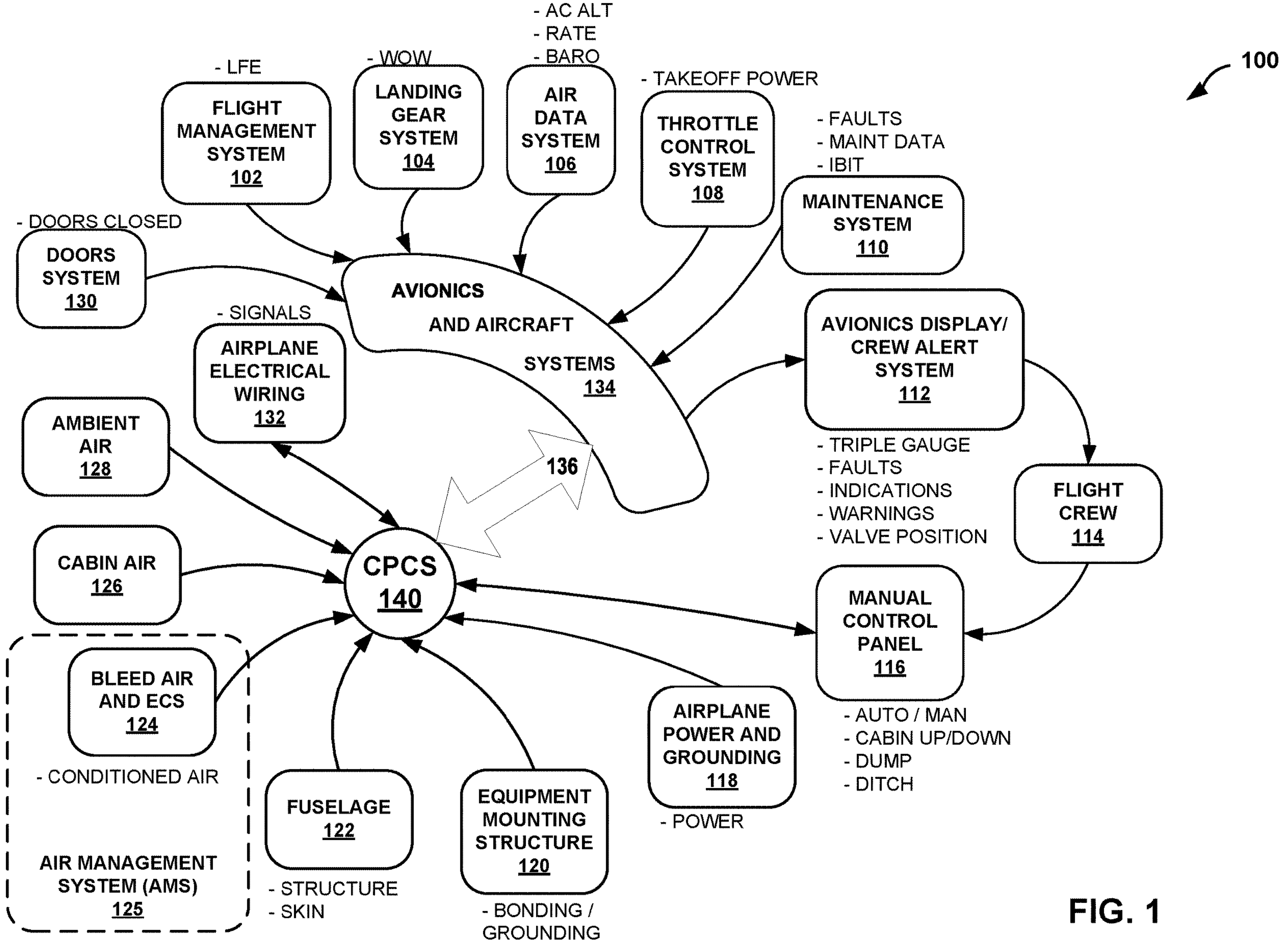
FIG. 1 is a boundary interface diagram illustrating an example distributed cabin pressure control system (CPCS) according to one or more techniques of this disclosure.

This disclosure describes a distributed aircraft cabin pressure control system (CPCS), and techniques for interfacing the distributed CPCS to the other aircraft systems. The CPCS-specific equipment of this disclosure may be used in a variety of different type aircraft with no hardware or software change to update the CPCS-specific equipment for each aircraft type. In this manner, CPCS-specific equipment may be developed that may be used in different type aircraft without the need for formal re-certification of the CPCS-specific equipment.

A CPCS is often subject to a high level of development assurance and aircraft integration application scrutiny from regulatory agencies. Therefore, the development costs of CPCS may be relatively high in comparison to other systems, especially for electronics and software certification of the CPCS.

One reason for the high scrutiny from regulatory agencies includes to manage hypoxia for people on board an aircraft. Hypoxia is a state of oxygen deficiency in the body sufficient to impair functions of the brain and other organs. Hypoxia may occur from exposure to higher altitudes because of the reduced barometric pressures and reduced oxygen that may be transferred to the blood by the lungs. A deterioration in night vision may occur at a cabin pressure altitude as low as 5,000 feet. From 12,000 to 15,000 feet of altitude, judgment, memory, alertness, coordination, and ability to make calculations may be impaired, and headache, drowsiness, dizziness and either a sense of well-being (euphoria) or belligerence may occur. Therefore avoiding hypoxia for the flight crew, and in the example of passenger aircraft, for passengers, is beneficial and is one reason for scrutiny for CPCS operation.

In contrast to the CPCS of this disclosure, other examples of CPCS may include electronics and software that are "customized" for each airplane, driving extensive formal development for each CPCS for each aircraft type to assure that each function is implemented safely and reliably. For automatic control, these customized cabin pressure controllers receives aircraft system inputs from the avionics and utilizes the CPCS own pressure sensor to perform the below functions. Each of these functionalities is at risk of being customized for a given airplane application. This results in "customized" CPCS part numbers for each different airplane type application.

For these aircraft type specific CPCS, in some examples, to deal with aircraft application to application customization the CPCS designers may create baseline software with a fixed list of functionality and then to tabularize setpoints, gains, or other characterization data that might change for each application. In these customized CPCS, setpoints, gains, or other characterization are specific for each aircraft type and are implemented using Parameter Data Items (PDI) that is customized, developed, and certified for each aircraft program application. The fixed list of functionality can include some functions that are enabled or disabled in a program application using PDI. However, if a customer, such as an aircraft manufacturer, or an airline purchasing the aircraft, desires a slight change to a functionality, or wants a new function, then all-new software must be developed for that application—with the associated development costs.

In contrast to the above, the distributed CPCS architecture of this disclosure may verify and validate functions that are handled within the CPCS, such as closed loop controls for pressure rate-of-change, valve position loop controls, motor loop controls, and similar specific CPCS functions. The CPCS-specific cabin pressure controller would have limited, and fixed, functionality and control algorithms in its hardware and software that would not change from airplane application to application, but it would instead be designed to utilize the "gain terms" received from the avionics software. The CPCS-specific equipment may receive information, e.g., the gain terms, from any of several avionics modules of a specific aircraft type, e.g., CPCS processes may be distributed throughout any of the several avionics modules. The distributed CPCS processes in the various avionics modules may send information to the CPCS-specific equipment that customizes the operation of the CPCS-specific equipment to that specific aircraft type, rather than storing fixed customized operation information in the CPCS-specific controller.

In this manner, the CPCS-specific equipment, and techniques for interfacing the CPCS-specific equipment to other aircraft systems may provide advantages over other CPCS systems. Some advantages may include significant cost savings because of the reduced need to fully validate and verify the CPCS-specific equipment for each aircraft type to meet regulatory requirements. Instead the CPCS-specific equipment may be verified and validated as a stand-alone component. Then when installed on a specific type aircraft, the CPCS may be validated along with the aircraft as a system to meet regulatory requirements. In addition, the CPCS-specific equipment of this disclosure may allow for flexibility for an aircraft manufacturer to establish operating procedures for the CPCS to meet the needs of the aircraft, as well as flexibility to customize operating procedures for the aircraft customer. For example, an aircraft type configured for cargo may have different operating procedures than the same aircraft type configured to carry passengers. An airline that flies shorter distances, e.g., a regional airline, may have different operating procedures than an airline that flies longer distances trips. An airline operating in a tropical region may have different operating procedures than an airline operating primarily in a colder climate.

FIG. 1 is a boundary interface diagram illustrating an example distributed cabin pressure control system according to one or more techniques of this disclosure. The distributed CPCS of system 100 in the example of FIG. 1 may look similar to a CPCS that is customized for a specific aircraft type. However, the information that passes between avionics and aircraft system 134 and CPCS 140 via the data buses 136 for the distributed CPCS 140 of this disclosure is very different from information passed between the avionics and other types of aircraft specific cabin pressure control systems discussed above. As noted above, CPCS 140 of system 100 of this disclosure allows for a significantly reduced burden to validate CPCS 140 to meet regulatory requirements and at the same time a significantly increased degree of flexibility for customizing the operation of CPCS 140 for an aircraft type, and for the end customer for that aircraft type, when compared to other cabin pressure control systems. In other words, the elements for system 100, including CPCS 140 and the aircraft systems may be similar to elements for other cabin pressure control systems. However, for the distributed CPCS of system 100, the avionics take on additional functionality and the cabin pressure controller for CPCS 140 would interface differently to the avionics for aircraft application-specific data.

The distributed CPCS of this disclosure, including CPCS-specific equipment CPCS 140, may interface with the avionics, e.g., via data buses 136, and interfaces to the flight crew 114, via manual control panel 116, also called the pilot control panel in this disclosure. The distributed CPCS of system 100 may also interface with the flight crew through the avionics interfaces with the pilot display and crew alert system 112. As can be seen the boundary diagram of FIG. 1, the connections, e.g., data buses 136, between CPCS-specific equipment, CPCS 140, and the avionics/aircraft systems 134 provides an interface to: doors system 130, flight management system (FMS) 102, landing gear system 104, air data system 106, throttle control system 108, maintenance system 110, avionics display/crew alert system 112, and ultimately to the flight crew, e.g., the pilots.

In the example FIG. 1, system 100 includes electronic controls for the following functions.

- Communications to the airplane systems—data bus(es) 136—air data system 106, flight management system 102, ground detection system, such as weight on wheels (WOW) detection for a landing gear system 104, doors locking/latching system 130, throttle control system 108, and similar systems;
- Signal conversion from flight deck controls (discrete, analog, or sometimes digital), e.g., via airplane electrical wiring 132;
- State logic—determining if a channel should, or is able to, actively control the outflow valve (OFV) of the CPCS; or, in the event of a dual-channel system, which channel should be in active control;
- Mode logic
  - detecting which phase of flight the aircraft is in (ground, takeoff, climb, cruise, descent, landing, initiated built-in test);
  - depending on the phase of flight:
    - determining what cabin altitude (pressure) command is required, using schedules, or using flight management system 102 inputs;
    - determining what the cabin altitude rate-of-change limits are required;
- Control algorithms for cabin pressure control within CPCS 140, for example:
  - Pressure and/or rate loops, including gains;
  - Motor/position rate loops, including gains;
  - Motor speed/direction loops, including gains;
  - Motor current/commutation loops, including gains;
- Feedback sensors including sensors of CPCS 140, and independent pressure sensors, including conditioning, read, computation into engineering units:
  - Pressure sensors, for pressure and rate;
  - Motor feedback sensors;
  - OFV position feedback sensors;
- System monitoring logic, e.g., via cabin air 126, ambient air 128, bleed air and engine control system (ECS) 124:
  - Detection of high cabin altitude—for warning;
  - Detection of over pressurization—for warning;
  - Detection of erroneous pressure control (various)—for fault detection and channel state logic (e.g. shut down of auto control, or transfer of control channel);
  - Indication of faults detected by hardware-software interfaces and built-in tests;
- Built-in Test Equipment (BITE) logic, fault handling logic:
  - Representative test failures related to equipment identified to troubleshoot;
  - Fault prioritization (which fault is really true);
  - Fault storage in memory and associated fault metadata;
  - Aircraft-level maintenance messaging and handling;
- Electronic hardware and software built-in test:
  - Power supply monitoring, e.g., from airplane power and grounding 118, equipment mounting structure 120, and fuselage 122;
  - Inputs monitoring;
  - Outputs (wraparound monitoring);
  - Command/response monitors (pressure, rate, position, motor, etc.); an
  - Sensors monitoring.

In some examples, avionics and aircraft systems 134 may "aggregate" all of these input modules together and consolidates data transfer on just a few data buses 136 to CPCS 140. In contrast to other types of cabin pressure control systems that are customized to manage all the functions listed above for each specific aircraft type, the distributed CPCS of system 100 comprises an aircraft cabin pressure control and monitoring system that:

- Includes the customizable functionality into the avionics 134 and AMS 125 software. However, the re-used functionality that is unchanged for each application into the CPCS-specific equipment, e.g., electronic hardware and software of CPCS 140.
- Enables a "hand-off" of some customizable elements (e.g., control algorithm gains, limits, set-points, and similar elements) from the customized avionics and/or AMS 125 software to the CPCS-specific equipment, CPCS 140 at the time of avionics/AMS power-up or initialization. Initialization may occur each time an aircraft is started from a shutdown state, e.g., each day (or multiple times each day) where voltage is applied to the avionics 134 and CPCS 140. At this time, CPCS 140 does not know on which airplane that CPCS 140 is installed, so CPCS 140 receives this data from avionics 134 via buses 136 to configure CPCS 140 itself for the functionality and customized operation for that airplane. In some examples, processing circuitry for the CPCS-specific equipment, CPCS 140, may store/retrieve the aircraft type specific data from a CPCS-specific non-volatile memory (not shown in FIG. 1) in the event that there is a power-cycle or reset of the CPCS-specific equipment electronics. In some examples, there may be one or more CPCS-specific equipment (controllers or valves) that receive(s) the customizable elements to perform the un-changed functional requirements (e.g. pressure/rate loop control algorithms, motor control algorithms, etc.).
- Utilizes dis-similar avionics/AMS modules and software to perform safety-related functionality such as command/response monitoring, indications, and warnings. In some examples, the dis-similar (e.g., separate) modules of the avionics may implement different CPCS functions within the avionics, such as computing/processing modules, crew alert system modules 112, flight management system modules 102. In other examples, separate modules of AMS 125 may implement different CPCS functions with AMS 125, such modules for bleed air control 124, temperature control, wing anti-ice, or AMS monitoring functions. In other words, system 100 comprises a "distributed" CPCS.

Utilizes CPCS-specific equipment sensor feedback, e.g., from sensors within CPCS 140 (not shown in FIG. 1), to send signals to the avionics/AMS software for use in indications, warnings, or command/response monitors. In some examples, the CPCS-specific equipment sensors and feedback paths (to the avionics/AMS) are independent enough to achieve the necessary development assurance requirements, e.g., via different buses of the multiple data buses of 136.

Figure 2:
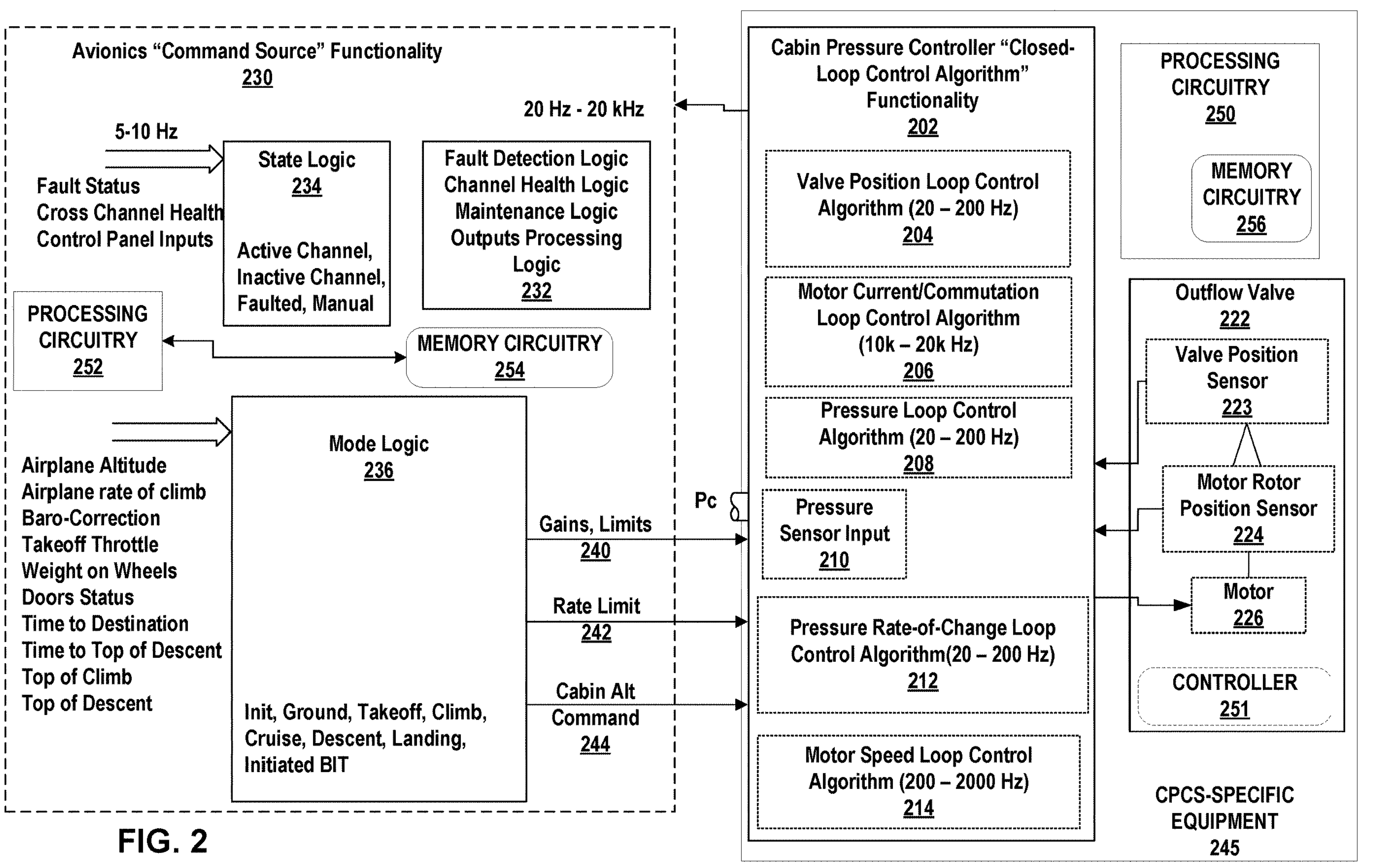
FIG. 2 is a system architecture diagram illustrating an example distributed CPCS according to one or more techniques of this disclosure.

FIG. 2 is a system architecture diagram illustrating an example distributed CPCS according to one or more techniques of this disclosure. For clarity, the example of FIG. 2 depicts only a single channel for the distributed CPCS. In practice, for a single OFV system, a distributed CPCS of this disclosure would include interfaces between the two avionics computers to the single cabin pressure control system. In other examples, an aircraft may include two or more outflow valves which may have separate controllers (not shown in FIG. 2).

In this disclosure, including for system 100 described above in relation to FIG. 1, the term "avionics" means the entire avionics system that may have multiple modules, including the input-output modules, processing modules, flight management system modules, crew alert system modules, display modules, pilot touch screen display modules, and other modules. In these various avionics modules, there are opportunities to include one or more CPCS software functionalities described in this disclosure, e.g., a "distributed" CPCS.

In some examples, the flight management computer (FMC) functionality, which may host the flight management system 102, because of the predictive method of the FMC of controlling the airplane, processing circuitry for the FMC may perform the cabin pressure command function because of the synergy of the two functions of aircraft control and cabin pressure control. Further, although "avionics" is used and considered throughout this description, other systems with multiple separate, independent (and possible dis-similar) computing modules may perform the functionality described as "avionics." In some examples, specifically, the air management system (AMS) controllers 125, which include control of bleed air, temperature, and wing anti-ice, described above in relation to FIG. 1 may perform at least some of the distributed CPCS functions. The AMS controls may also be associated with the cabin pressure control system from an airplane integration standpoint. In the example of a distributed CPCS of this disclosure that may use an AMS controller, the AMS controller may have access to the aircraft systems information described in this disclosure. In other words either or both of the FMC or AMS may act as processing circuitry 252 depicted in FIG. 2 to perform the avionics "command source" functionality 230.

In the distributed CPCS of this disclosure, avionics can utilize existing avionics capabilities to gather and use the aircraft systems information, without having to communicate this information to CPCS-specific equipment. Thus, avionics may inherently already have the following aircraft systems information to use in CPCS logic: door status from the doors system (are doors open or closed?), FMS information including landing field elevation, top of climb altitude, top of descent altitude, time to top of climb, time to top of descent, time remaining in the flight, and similar information. The avionics (and AMS) may also have access to information from the landing gear system (airplane on ground or in flight), from the air data system (airplane altitude, airplane altitude rate of change, barometric correction), the throttle control system (are throttles at takeoff power, cruise power, climb power, or descent power), from the maintenance system (including detected faults, maintenance actions, and similar data), from the avionics display/crew alert system, which may display indications of cabin altitude, altitude change rate, differential pressure, landing field elevation, high cabin altitude warning, excessive differential pressure warning, CPCS auto fault, loss of air data information, and other data.

Accordingly, for the distributed CPCS system of this disclosure, the avionics may perform the mode logic function of determining a phase of flight based on the position of the landing gear, the position of the throttles, the aircraft speed and altitude and similar information. The avionics may transmit gain terms, and other data, to processing circuitry 250, that include how the CPCS should operate for the phase of flight, as determined by the avionics. In contrast, for a fully customized CPCS validated for a specific aircraft type, the avionics may directly send the door status, throttle status, landing gear position and other information to the controller for the fully customized CPCS, and the controller may determine the phase of flight, and therefore how to operate the CPCS. Therefore, as described above in relation to FIG. 1, the data sent between the avionics and the CPCS controller via data buses 136 of FIG. 1 is very different for the distributed CPCS of this disclosure compared to a fully customized CPCS.

In some examples, avionics computers share aircraft systems information across all of the avionics modules using a set of redundant high-speed data buses (e.g. ARINC 629, ARINC 653, or other Ethernet switched type buses). Thus, avionics may be a desirable set of computing hosts, e.g., processing circuitry 252, to acquire and share the above listed information.

Avionics command source functionality 230 may be hosted and executed by the FMS, AMS, e.g., FMS 102 or AMS 125 shown in FIG. 1, or some other avionics processing circuitry. In the example of FIG. 2, avionics command source functionality 230 includes state logic 234, fault detection logic 232, mode logic 236, all of which may be executed by processing circuitry 252, which is also operatively coupled to memory circuitry 254. As described above for mode logic in relation to FIG. 1, mode logic 236 may receive operational information from aircraft sensors, e.g., throttle settings, landing gear up or down, weight on wheels, doors status and similar information to determine the aircraft mode, or phase of flight. Some examples of the different modes may include ground operation, takeoff, landing, climb, descent, cruise as well as maintenance operations such as built-in-test (BIT).

For automatic control of cabin pressure, the avionics can utilize the above listed information from aircraft systems to perform mode logic 236. Mode logic 236 does not have to be performed at a high computational rate, and could even be scheduled as slow as one computation per second, e.g., computations at the rate of one Hertz (Hz). Thus, mode logic 236 may be a useful function for the avionics to perform. Mode logic 236 may include: detecting which phase of flight the aircraft is in (ground, takeoff, climb, cruise, descent, landing, initiated built-in test). Depending on the phase of flight, mode logic 236 may also determine what cabin altitude (pressure) command is required, for example, using stored altitude pressure schedules or using flight management system inputs. The mode logic 236 function may also include determining limits for the cabin altitude rate-of-change. In some examples, altitude rate-of-change limits may be determined by a manufacturer for a specific aircraft type. In other examples, each individual airline may set rate-of-change limits based on airline policy and the rate-of-change limits, and other CPCS parameters, may differ from airline to airline, even for the same aircraft type. Rate of change limits may be determined, for each phase of flight, based on analysis of the airplane performance versus other system constraints, such as the limit of the cabin-to-ambient differential pressure and industry standards for passenger comfort (reference industry standard SAE ARP1270).

Because the avionics may have FMS inputs, the avionics, acting as processing circuitry 252, may "schedule" the desired cabin altitude based upon predictive information, ultimately resulting in a more comfortable cabin pressure "command" than reacting just to the actual airplane altitude and a resulting "scheduled" cabin altitude command. As a result of engineering analysis for each aircraft type, cabin pressure command and rate limit for each mode (e.g., phase of flight) may also have associated closed-loop control algorithms to control to these commands/limits that may be customized for each aircraft type within the avionics, e.g., avionics command source functionality 230. These control algorithms may have associated gains for pressure, rate, motor speed command (or valve position), and motor current/commutation loops that would be used by the CPCS specific equipment to control cabin pressure. In some examples, processing circuitry 250 for CPCS-specific equipment 245, may receive gain and limits 240, rate limit 242 and cabin altitude command 244 from processing circuitry 252, and store terms in memory circuitry 256 e.g., to operate outflow valve 222.

These gains terms from avionics command source functionality 230 might include proportional, integral, or differential terms. Further, dead-bands and/or hysteresis limits and other control algorithm terms may be utilized. In this disclosure "gain terms" may refer to any customizable terms to control the CPCS. Thus, for this disclosure, "gain" is not limited to the common usage of "gain" e.g., the gain of an amplifier or a rate term. The above custom "gain terms" (also including dead-bands, hysteresis limits, or other terms) are computed as unique for each airplane application. These gain terms may be saved as parameters with the avionics software, e.g., stored at a location of memory circuitry 254, which is operatively coupled to processing circuitry 252. In this disclosure, "indications" from the avionics circuitry may include such data as a phase of flight, e.g., from mode logic, an air pressure, e.g., ambient air pressure, as well as commands, such as cabin altitude commands 244. Also in this disclosure, the term indications may include the gain terms described above. Accordingly, indications may be sent to CPCS equipment 245 via one or more data buses, and similarly, CPCS equipment 245 may send one or more indications (warnings, data, pressure readings, OFV position, and similar information) to the avionics via the one or more data buses.

In a cabin pressure control system, closed loop control may be from 50 milliseconds (outer pressure loop, e.g., pressure loop control law 208) to as fast as 50 microseconds (motor current/commutation loop 206). It should be noted that the avionics may be a less desirable host to execute these control algorithms, because the avionics usually computes within a larger structure of interfaces that make it challenging for the avionics to operate with "tight" control loops (faster than 100 to 200 milliseconds or 10 to 5 Hz).

Although the pure computational speed of the avionics computer is quite capable, in some examples, processing circuitry 252 of the avionics computer may be unable to receive inputs from other sources (e.g. pressure sensors, motor currents/rotor position, valve position) and transport the data internal to the avionics to the computational function of the avionics, compute the control algorithms, and then transmit the results to a dedicated "port" (e.g. data bus or analog output) to output the "control signal" to the motor or valve, of the CPCS specific equipment, and then have the controlled element (motor, valve, etc.) respond in time. This sequence of events, and the delays that result, is called "transportation delay." Further, in some examples the avionics may not house pressure sensors 210 or other CPCS-specific feedback types (for example, current sensors, motor rotor position sensors, and valve position sensors). Processing circuitry 252 for avionics computing devices may not designed to perform synchronized outputs (such as 3-phase motor control signals timed with motor sensor feedback).

Therefore, CPCS-specific equipment 245 (controllers and/or pressure sensors) may be the best systems to manage direct control of outflow valve 222 rather than have the avionics to perform these functions. Accordingly, for the systems of this disclosure, CPCS-specific equipment 245, is an example of CPCS 140 shown in FIG. 1, and may perform the sensing and control law functionality, shown by closed loop control law functionality 202 in the example of FIG. 2.

Upon power-up and initialization of the aircraft (including the avionics and CPCS-specific equipment 245), gain terms, including limits, such as gains and limits 240 and rate limit 242 may be sent from the avionics software to the CPCS-specific equipment 245 (controllers), e.g., processing circuitry 250, that will perform those cabin pressure closed-loop control algorithms 202. For example, the avionics would supply these gain terms to the cabin pressure controller, processing circuitry 250, via one or more data buses, such as data buses 136 of FIG. 1.

Examples of cabin pressure controller closed loop control algorithms functionality 202 that may be executed by processing circuitry 250 may include valve position loop control law 204, motor current/commutation loop control law 206, pressure loop control law 208, pressure rate-of-change loop control law 212 and motor speed loop control law 214. The control law functions may receive feedback from sensors, such as cabin pressure (Pc) from pressure sensor input 210, the position of outflow valve 222 from valve position sensor 223, and the operation of motor 226 from motor rotor position sensor 224. Processing circuitry 250 may receive the gain terms from the avionics and in some examples store the terms in non-volatile memory 256, in case of a reset or power cycle, as described above in relation to FIG. 1. Processing circuitry 250 may execute the different control algorithms at different loop speeds, depending on the function. For example, motor current/commutation loop control law 206 may operate at about 10 kHz to 20 kHz, while pressure loop control law 208 operates at about 20-200 Hz. In other examples, the cabin pressure controller could be implemented where there is further distribution between the stand-alone cabin pressure controller 202 (controlling the pressure/rate control loops) and a portion of the controller that might be integrated within the electro-mechanical actuator on outflow valve 222.

In operation, outflow valve 222 includes an actuator, motor 226, configured to control a position of outflow valve 222. Outflow valve 222 is configured to release pressure from a cabin of the aircraft to atmosphere, while conditioned air may be by AMS 125 of FIG. 1. Pressure sensor (Pc) may be configured to sense air pressure of the cabin and the sensed pressure converted to an electronic signal by pressure sensor input 210. Processing circuitry 250 may receive a signal from the pressure sensor input 210 comprising cabin pressure of the cabin and also receive a position of the outflow valve from outflow valve position sensor 223. Processing circuitry 250 may further receive, from the avionics circuitry of the aircraft, a variety of indications, the indications including the phase of flight for the aircraft, and various gain terms 240 for the phase of flight, such as a cabin pressure setpoint for the phase of flight, cabin pressure limits for the phase of flight, a cabin pressure change rate for the phase of flight and a pressure change rate limit 242 for the phase of flight. In some examples, processing circuitry 250 may receive, from the avionics circuitry, other gain terms 240 associated with the phase of flight, wherein the one or more gain terms comprise pressure, rate, actuator speed command, valve position, and one or more of an actuator current loop, actuator commutation loop, dead band limits, or hysteresis limits. Processing circuitry 250 may operate the actuator, motor 226 for outflow valve 222 based on the plurality of indications from the avionics circuitry, the one or more gain terms, the cabin pressure (Pc), and the position of the outflow valve.

The CPCS-specific cabin pressure controller, processing circuitry 250 is utilized for automatic control of cabin pressure. The CPCS may also be operated manually based on input from the flight crew, e.g., manual control panel 116 described above in relation to FIG. 1. As noted above, processing circuitry 250, may receive relevant inputs from the avionics to perform the closed-loop control of cabin pressure, including "gain terms" and other data, such as ambient pressure 128 of FIG. 1, received via data buses 136 of FIG. 1. Other closed loop sensors used for feedback include a cabin pressure sensor (Pc), valve position sensor feedback circuit 223 (to software executed by the controller, processing circuitry 250), a motor rotor position sensor feedback circuit 224 (to software), a motor current sensor and feedback circuit 206 (to software), which is listed as motor current/commutation loop control law 206 in the example of FIG. 2 and in some examples includes a motor current sensor. In this manner, the CPCS-specific cabin pressure controller, processing circuitry 250, may be implemented in electronics and software, interfacing with outflow valve position sensor 223, motor rotor sensor 224, motor 226 and other components of FIG. 2.

In some examples, the cabin pressure controller may be a stand-alone electronics and software assembly and remotely drive the outflow valve 222, and OFV motor 226, with no electronics mounted directly on the outflow valve, with the exception of the sensors themselves. In this example, the controller output executed by processing circuitry 250 would be analog signals to the outflow valve motor 226 (driving the motor phases), and the controller would receive feedback from valve position sensor 223 and motor rotor position sensor 224 to close the control loops.

In other examples, the cabin pressure controller design elements may be split into functions that are both in a separate electronic enclosure—mounted separate from the outflow valve—and electronics/software that are mounted within the electro-mechanical actuator on the outflow valve. For example, valve position sensor 223, valve position sensor feedback electronics, e.g., amplifiers, filters and similar electronics, motor 226, motor rotor sensor 224, motor rotor sensor feedback electronics coupled to motor rotor sensor 224, motor current sensor and feedback electronics, etc. may all be mounted within the electro-mechanical actuator shown as outflow valve 222 in FIG. 2. Complete motor control may be performed directly on the outflow valve. In this example, valve position or motor speed/direction commands would come from the separate cabin pressure controller 250 to controller 251 contained within the electro-mechanical assembly that is controlling the outflow valve motor.

If there is a portion of the cabin pressure controller mounted directly in the electro-mechanical actuator, it will have a fixed design and software that is unchanged from airplane application to airplane application. Thus, this part of the controller (valve motor controller) is designed as a specific-purpose function relative to the range of valve sizes (and motors) it must control. In some examples, if motor 226 requires greater torque to operate a larger outflow valve size or flow, the motor controller, e.g., controller 251, may have to increase the current limit accordingly. Therefore, the motor controller would receive the current limit as part of its commands from the stand-alone cabin pressure controller 250, which receives this current limit from the avionics software. As noted above, the CPCS-specific cabin pressure controller may have limited, and fixed, functionality and control algorithms in its hardware and software, e.g., cabin pressure controller closed loop control algorithms functionality 202. This functionality and control algorithms may not change from airplane application to application, but it would be designed to utilize the "gain terms" stored and transmitted from the avionics software.

Once received, the cabin pressure controller will store the gain terms in its non-volatile memory, memory circuitry 256. Therefore, in the event of a momentary power interruption, a micro-controller reset, or the event of a Single Event Upset (SEU), the gain terms can be restored with no loss of functionality.

Examples of processors in this disclosure, such as processing circuitry 252, processing circuitry 250 and controller 251 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

Examples of memory in this disclosure, such as memory circuitry 254 and 256 may include any type of computer-readable storage media, such as random access memory (RAM), read only memory (ROM), programmable read only memory (PROM), erasable programmable read only memory (EPROM), one-time programmable (OTP) memory, electronically erasable programmable read only memory (EEPROM), flash memory, or another type of volatile or non-volatile memory device. In some examples, the computer readable storage media may store instructions that cause the processing circuitry to execute the functions described herein. In some examples, the computer readable storage media may store data, such as configuration information, temporary values and other types of data used to perform the functions of this disclosure.

In some examples, an initialization protocol could include that the cabin pressure controller, processing circuitry 256, would identify that it has powered up and continually send a message to the avionics that it is ready to receive gain terms. The avionics, including avionics command source functionality 230, which may initialize with different timing than the cabin pressure controller, would receive the cabin pressure controller "ready" message and then transmit the gain terms in a data stream e.g., with cyber-secure methods. Once the controller, either or both of processing circuitry 250 and/or controller 251, receives and validates the inputs, the controller would send a "received" message back to the avionics to cause the avionics to cease sending the data and for the avionics processing circuitry 252 to begin its continuous cabin pressurization functional logic. In some examples, each of valve controller 251 and processing circuitry 250 may be separately configured to receive and store at least some of the gain terms.

For safety reasons, some avionics inputs should update each avionics computational "command" frame (10 Hz to 5 Hz) to ensure "refreshed" values are always received. This is to ensure that information is not corrupted in the CPCS-specific equipment that could allow processing circuitry 250 to control cabin pressure to unsafe values (e.g., caused to single event upset (SEU) corruption of memory 256, or based on some other cause). Besides the actual cabin pressure command and rate limit commands, shown as gains and limits 240 and rate limits 242, the following may also be provided to the CPCS controller, processing circuitry 250, as refreshed gain term data:

- Cabin altitude limits—the value of the minimum and maximum cabin altitude that the CPCS-specific control system is configured control within;
- Differential pressure limits—the value of the maximum cabin-to-atmosphere differential pressure that the CPCS-specific control system is configured to control within; and
- Maximum rate-of-change limits—the value of the maximum positive and negative rates of pressure change the CPCS-specific control system is set to control within. The above airplane application-specific limits are examples only, and there may be other limits or gain terms that may also be refreshed. The point is that there are some foreseeable values that may be refreshed periodically to enforce safety limits of the control system. These limits may be specified based on the aircraft type and/or based on the airline operating policy. In some examples, if the CPCS-specific equipment 245 does not receive a refreshed value of these limits from the avionics within a certain time duration (e.g. 1-second), processing circuitry 250 may generate and output a fault message back to the avionics. In some examples, the CPCS-specific equipment 245 may disable itself from automatic control and notify the flight crew, e.g., via avionics display/crew alert system 112 of FIG. 1.

The CPCS-specific equipment 245, which contains function-specific pressure sensors, microcontrollers, motor control electronics (e.g. gate drivers and inverters), motor and valve sensor feedback conditioning circuitry that can perform the closed-loop control algorithms to operate OFV 222 such that the cabin pressure follows the avionics-generated command. These control algorithms, as shown in FIG. 2, might be operated at rates from 50 Hz to 20 kHz, and are therefore may be less desirable for execution by avionics processing circuitry.

As noted above, in some examples within the hardware and/or software the following control algorithms are performed:

- Pressure and/or rate loops 212, including gains;
- Valve position loops 204, including gains;
- Motor speed/direction loops 214, including gains; and
- Motor current/commutation loops 206, including gains.

These control algorithms remain in the CPCS-specific equipment 245 and are performed according to industry standards (no attempt to specify the pressure/rate/position/motor speed/current/commutation control loops are made in this disclosure). Notable is that the control algorithms are tuned or customized for each airplane application. Unlike previous types of CPCS, for the CPCS of the disclosure the "tuned" gain terms are provided by the avionics. The avionics are already customized for each airplane type application. Thus, those control algorithms, e.g., pressure loop control law 208, that are the subject of tuning may be software-based for the systems of this disclosure, so that gain terms provided by avionics can be utilized.

The control algorithms are each designed with the form such that their gains ("gain terms" e.g. including dead-bands or limits, and similar terms as described above.) are constants that are changeable with each aircraft application. Therefore, the control algorithms are fixed (unchanged) software within the CPCS-specific equipment 245 that need never get re-developed. CPCS-specific equipment 245 may operate differently from airplane application to airplane application, but the differences are based on the different gain terms output by the avionics and received by the CPCS-specific equipment 245.

In other words, CPCS-specific equipment 245 of this disclosure is configured to be installed into a first aircraft type and to receive a first set of indications, e.g., phase of flight, and a first set of gain terms from first avionics circuitry of the first aircraft type. The same CPCS-specific equipment 245 may also be installed into a second aircraft type different from the first aircraft type. This second CPCS-specific equipment 245 may also a second set of indications, e.g., from mode logic of the second aircraft, as well as a second set of gain terms from second avionics circuitry of the second aircraft type. Because the aircraft types are different, then in some examples, at least the first set of gain terms may differ from the second set of gain terms. As noted above, CPCS-specific equipment 245 may comprises core hardware and core software. The core hardware and the core software are each configured to be installed in each of the first aircraft and the second aircraft and may function somewhat differently, e.g., different rate-of-change limits, because of the different gain terms from the respective avionics. As described above, some examples of gain terms may include gains for pressure, rate, motor speed command, valve position, closed-loop control algorithms, dead-bands, hysteresis limits, motor current, and motor commutation settings.

Likewise, CPCS-specific hardware 245 and software design, e.g., stored in memory circuitry 256, may receive inputs from the following sensors such as: pressure sensors (Pc, and/or ambient air 128 of FIG. 1), valve position sensors 223, motor rotor position sensor 224, motor inverter current sensors and voltage sensors, e.g., from a motor driver circuit controlled by motor speed loop control law 214, and similar sensors.

As these feedback devices are utilized with the control algorithms, (running at 50 Hz to 20 kHz), these sensor feedbacks may be received via analog or fast digital means and may be less suitable for avionics to directly process. However, some of the sensor data may be provided to the avionics by CPCS-specific equipment 245 that may process these inputs. These data may be provided by a data bus and used by the avionics to perform higher level built-in test.

Since these sensors, and other electronics functions (e.g. power supplies, analog inputs, digital inputs and outputs, motor drivers, etc.) have potential failure modes, processing circuitry 250 for CPCS-specific equipment 245 may perform built-in test (BIT) on these circuits to determine equipment health. Because the CPCS-specific hardware would be unchanged for each airplane application, software that performs these built-in tests may be common and unchanged from airplane application to application.

The status of these low-level built-in test may reported to the avionics via a data bus. If CPCS-specific equipment 245 detects a condition where the system cannot perform a function, processing circuitry 250 may disable itself and report to the avionics. In the event that the avionics software detects an application specific CPCS-specific equipment health anomaly, the avionics can also shut-down the CPCS-specific equipment.

In some examples, a situation where a common low-level failure of the CPCS-specific equipment 245 may be ignored in the CPCS-specific equipment self-monitor, because in normal applications such a low-level failure may be acceptable. But, because the avionics software is customizable, and because there may be a heightened level of prevention for a given failure mode, the avionics computer can override this decision even though the CPCS-specific equipment 245 would otherwise consider itself healthy enough to continue operation.

An example of this would be a special application-specific residual pressure protection function that requires the CPCS-specific pressure sensor accuracy to be a tighter tolerance than the normal CPCS-specific pressure sensor built-in test limits. For example, the CPCS-specific equipment error limit may be ±300 feet, whereas the avionics limit may be ±75 feet (due to the sensor tolerance required for residual pressure protection). In this case, when the avionics monitor software detects a pressure sensor error greater than its tighter tolerance threshold, the avionics computer may shut down the CPCS-specific equipment (or raise a failure message to the flight crew for special action).

In some examples, pressure sensor input 210 may function as an independent source of data and also provide inputs to the avionics, e.g., via a data bus, as well as to the cabin pressure controller, processing circuitry 250. This redundant pressure feedback may be used by the avionics, e.g., via the crew alerting system, for system monitoring logic, such as detection of high cabin altitude, e.g., a low cabin pressure, as well as for detection of over pressurization. The independent pressure sensor may include electronic hardware and software built-in test as noted above such as for power supply monitoring, outputs, or wraparound monitoring and for sensors monitoring.

In the event of a cabin pressure controller auto control failure, the pilot control panel, e.g., manual control panel 116 of FIG. 1, may enable the pilot to switch the system to "manual" control (away from auto control) and operate the OFV manual motor to adjust the OFV position to crudely adjust the cabin altitude (e.g., cabin pressure). In some examples, the pilot control panel might also be used to perform cabin pressure dump function (depressurize the fuselage to a safe limit) or "ditching" function (closing the OFV prior to "landing" on water).

Figure 3:
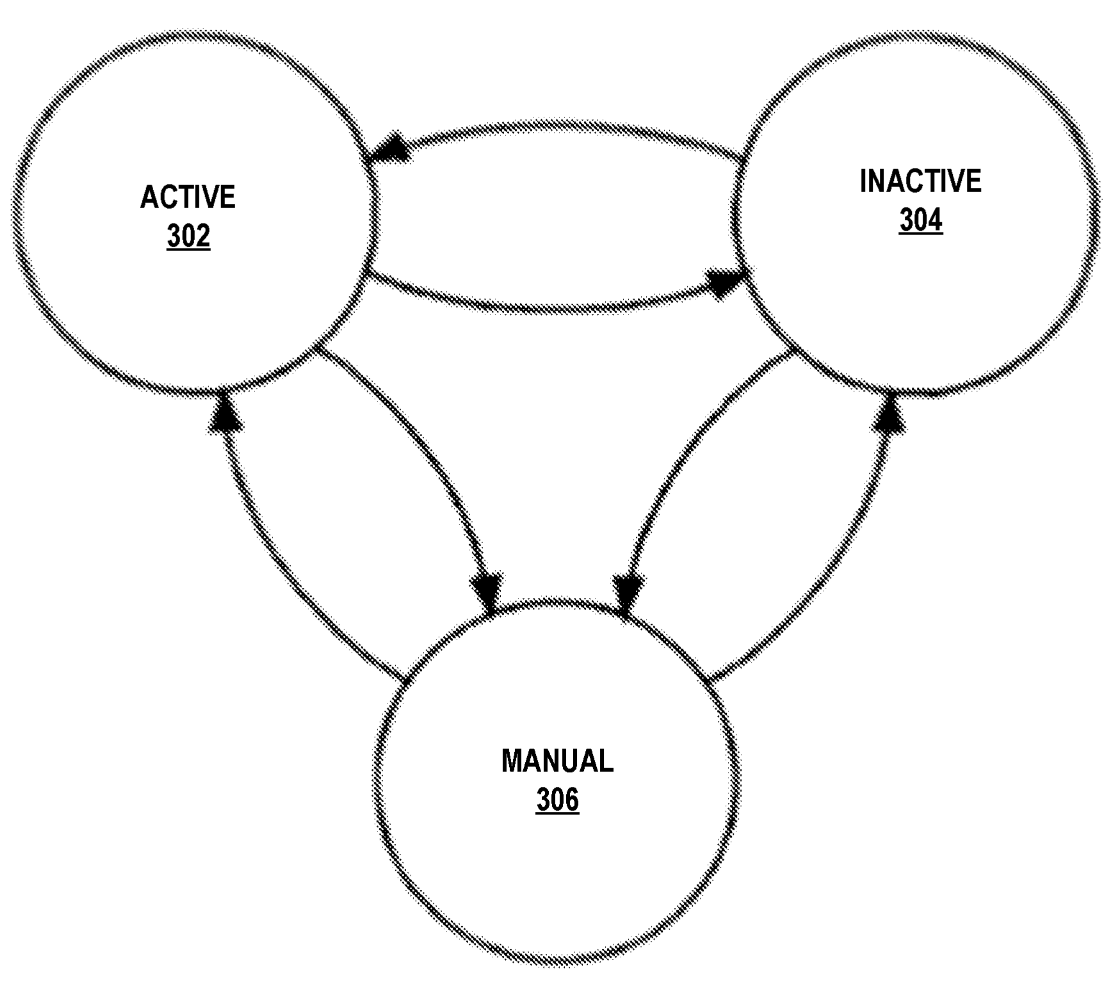
FIG. 3 is a state diagram illustrating redundant control of the CPCS of this disclosure.

FIG. 3 is a state transition diagram illustrating redundant control of the CPCS of this disclosure. In most aircraft, there are usually at least two avionics computers. Therefore, in some examples, the CPCS functionality of this disclosure that is handled by the avionics may be performed redundantly. In some examples, the two or more avionics computers will utilize "state" logic to determine which avionics channel will have the authority to command the CPCS-specific equipment 245 of FIG. 2. The controlling computer may be considered "active" 302 control status. The standby or alternate avionics computer may be on "inactive" 304, or standby control status. Inactive computer 304 may be ready to take control if the active channel 302 gives up control. Another possible state is "manual" 306, which is when the pilot selects the CPCS functionality to be manually controlled, e.g., on manual control panel 116 of FIG. 1.

State transition logic between two channels may be performed in one of several ways. In some examples, both avionics channels are healthy, then there can be a priority channel (e.g. always channel 1) that takes control after initialization of both channels and acts as active 302. In other examples, channel switching logic may swap active channels each flight, for example. In the event of loss of a given channel, e.g., because of a built-in test in progress, that channel sets itself to inactive 304, and then the other remaining healthy channel gains active 302 control status. When manual control 306 is set by the pilot, both channels set themselves to manual.

In other words, in some examples the avionics circuitry of the aircraft may include separate and independent modules, e.g., separate, and independent computers, that may be configured to perform dissimilar functions of the avionics circuitry. In some examples, at least some modules of the separate and independent modules may share information with other modules of the separate and independent modules, for example for cross checking or other reasons.

In some implementations, a first module of the separate and independent modules may compute a first indication and a first gain term and output the first indication and first gain term to the CPCS over a first communication channel, e.g., one of the data buses 136 depicted in FIG. 1. Similarly, a second module of the separate and independent modules may to compute a second indication, e.g., door status or weight on wheels and compute a second gain term, then output the second indication and second gain term to the CPCS over a second communication channel separate from the first communication channel, e.g., a separate data bus. In some examples, one or more of the separate and independent modules may perform safety related functions. The safety related functions may include one or more of: monitoring of a command and a response to the command, determining whether CPCS operation merits a warning, and outputting the warning to a crew of the aircraft. In some examples, the one or more modules may be configured to receive sensor feedback from CPCS specific equipment (e.g., from CPCS 140 or 245 shown in FIGS. 1 and 2) to perform the safety related functions. Some examples of the separate and independent modules may include at least: crew alert system modules, flight management system modules, input-output modules, processing modules, display modules, pilot touch screen display modules, and air management system (AMS) modules, described above in relation to FIGS. 1 and 2.

Other redundancies may be implemented by the CPCS of this disclosure. Similar to the redundancies described above in relation to FIG. 2, avionics may perform CPCS monitoring logic in a redundant manner to the CPCS-specific equipment. Avionics can receive pressure sensor outputs from the cabin pressure controller's pressure sensor, or from the independent pressure sensor. Avionics can utilize the pressure sensor inputs in engineering units of "pressure" or "feet" or rate-of-change (psi/sec or feet/minute) as required for the monitoring need.

From this information, the avionics may compute the cabin altitude, and cabin altitude rate-of-change for display (and/or aurally) to the pilots. The avionics can also compare the actual cabin altitude to various caution and warning thresholds associated with that specific airplane application. If the actual cabin altitude exceeds a given threshold, e.g., the cabin pressure goes below a given threshold, the avionics may compute an "excess cabin altitude" caution or warning and present it to the flight crew.

Avionics can then also compute the cabin-to-ambient differential pressure using one of the cabin pressure sensor inputs and subtracting off the ambient pressure (computed from the airplane altitude) that is available from the primary or secondary air data systems, e.g., air data system 106 of FIG. 1.

From this information, the avionics can compute the differential pressure for display to the pilots. The avionics can also compare the actual differential pressure to various caution and warning thresholds associated with that specific aircraft application. If the actual differential pressure exceeds a given threshold, the avionics can compute an "excess differential pressure" caution or warning and present it to the flight crew.

During the times when the avionics are computing the mode logic and the resulting cabin pressure commands and rate limits, avionics can also use the actual cabin pressure (and rate and differential pressure) information to compare to the commands (command response monitor (CRM)) to "monitor" the adequacy of the CPCS-specific equipment 245 of FIG. 2 for "controlling" (using closed-loop control algorithms) the cabin pressure (and rate and differential pressure). In the event the avionics detects a malfunctioning cabin pressure control function, it can disable the CPCS-specific equipment performing that function and indicate a message to the flight crew (e.g. loss of automatic control) to select to manual control (assuming a single auto control channel in the CPCS-specific equipment). In addition to performance monitoring, avionics may also receive health messages from CPCS-specific equipment and from other aircraft systems. As a result, avionics can perform high-level system built-in test (BIT) to monitor the capability of the overall CPCS to continue automatic control.

There are many implementations of this monitoring functionality in various CPCS-specific equipment applications, and these functions may be re-implemented into the avionics, because the speed of these monitors is not necessarily be faster than 10 Hz. And, because the avionics can receive data (including raw fault data) from the CPCS-specific equipment, and perform its own monitors, avionics may perform its own fault handling and recording methods. The fault handling and recording may enable direct information exchange with the maintenance computer and allows a comprehensive method for fault storage and fault-to-maintenance action correlation.

Figure 4A:
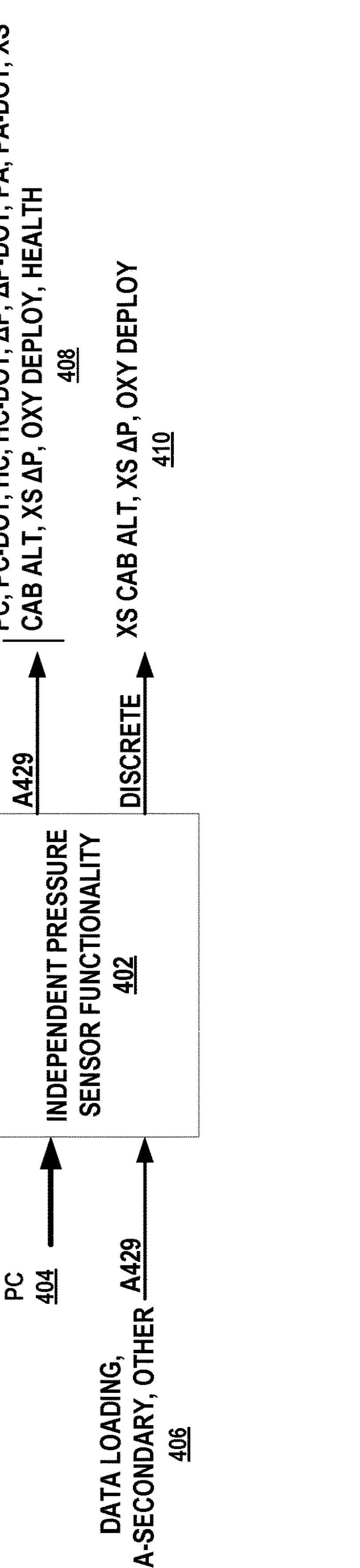
FIGS. 4A, 4B and 4C are block diagrams illustrating example communication arrangements for the for the independent pressure sensor of this disclosure.
Figure 4B:
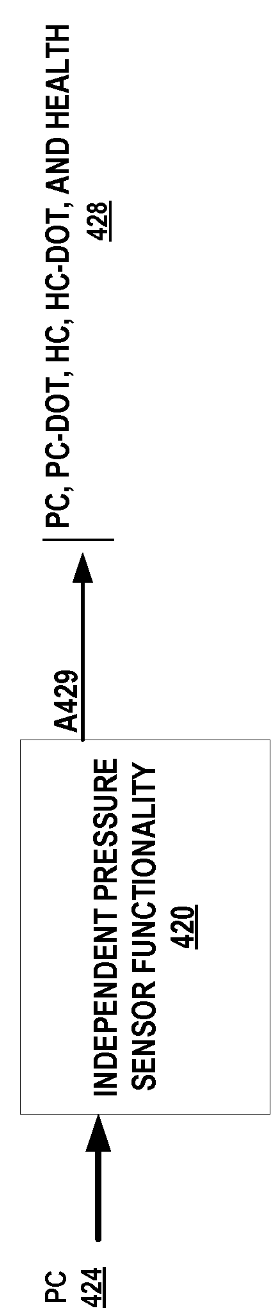
Figure 4C:
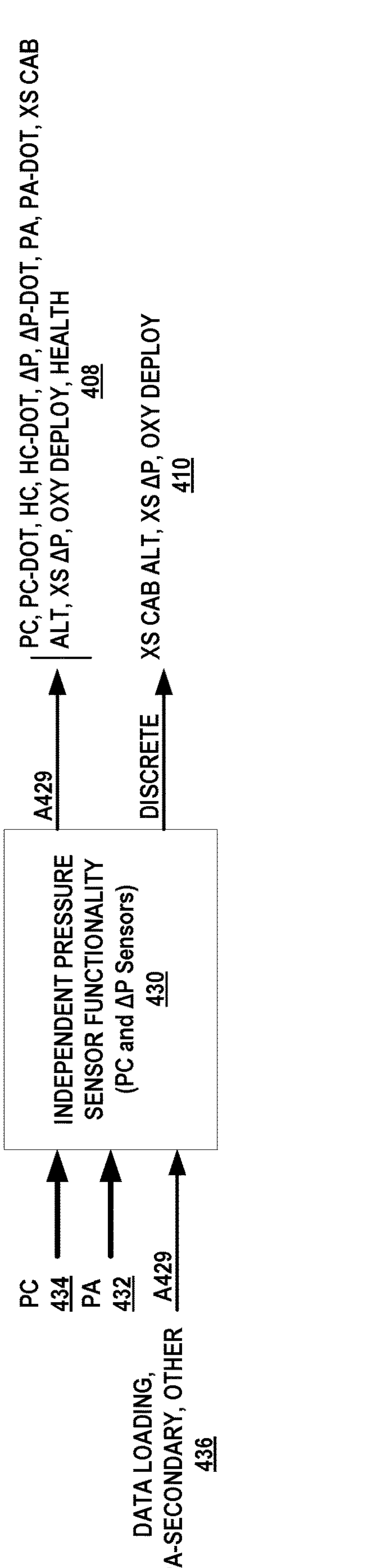

FIGS. 4A, 4B and 4C are block diagrams illustrating example communication arrangements for the independent pressure sensor of this disclosure. The example of FIG. 4A depicts an implementation of the independent pressure sensor, described above in relation to FIGS. 2 and 3. An independent pressure sensor may be used to enable monitoring of the (automatic) cabin pressure controller. In some examples, avionics may receive the cabin pressure sensor inputs, independent from any pressure sensor data received from the (automatic) cabin pressure controller. Thus, if the cabin pressure controller provided false outputs, or there was erroneous control of the cabin pressure due to a pressure sensor failure within the cabin pressure controller, the independent pressure sensor outputs would still be valid and could be used by the avionics to detect erroneous control or failure. Further, if there is a failure of the cabin pressure controller that could cause loss of automatic control and loss of the controller's pressure sensor output (e.g. due to a loss of power), then the independent pressure sensor data could be used for pilot reference during manual control.

As shown in the example of FIG. 4A, independent pressure sensor 402 receives a pneumatic cabin pressure "PC" 404 in its port, and computes a signal representing cabin pressure 408. Then, from this cabin pressure, engineering parameters can be calculated and transmitted for: cabin pressure, PC; cabin pressure rate of change, PC-DOT, cabin altitude, HC, cabin altitude rate of change, HC-DOT, excessive cabin altitude warning, XS CAB ALT (also provided as a discrete output 410), oxygen deploy-OXY DEPLOY (also provided as a discrete output 410).

If a communications input 406, from avionics, is provided to the pressure sensor via ARINC 429 (A429), or similar data bus, and air data system information is included (airplane altitude), the pressure sensor can also calculate and transmit: ambient pressure, PA, ambient pressure rate of change, PA-DOT, cabin-to-ambient differential pressure, AP, excessive cabin-to-ambient differential pressure warning, EX AP (also provided as a discrete output 410).

The excessive cabin altitude warning (XS CAB ALT) and excessive cabin-to-ambient differential pressure warning (EX AP) and oxygen deploy signal (OXY DEPLOY) may be compared to airplane application-specific thresholds, e.g., determined by the aircraft type. Therefore, the thresholds would need to be provided to the independent pressure sensor by the avionics, using ARINC 429 data bus, or similar. Discrete outputs for these signals may be required to disable or enable functions in the cabin pressure controller (or outflow valve) and the oxygen deploy system. The airplane application-specific thresholds for these three signals (XS CAB ALT, EX AP, and OXY DEPLOY) may be transmitted to the independent cabin pressure sensor similar to the gain terms communication described above in relation to FIGS. 1-3.

FIG. 4B depicts an example of an independent pressure sensor in which the ARINC 429 interface and discrete outputs are not used for independent pressure sensor 420. Similar to the pressure sensor in FIG. 4A, independent pressure sensor 420 receives cabin pressure, PC 424, and may output PC, PC-DOT, HC, HC-DOT, and health (428). In the example implementation of FIG. 4B, the pressure sensor data to the avionics is received directly via the avionics channels, and the following information may be computed using the customized airplane-specific parameters available in avionics software:

Cabin pressure, PC
Cabin pressure rate of change, PC-DOT
Cabin altitude, HC
Cabin altitude rate of change, HC-DOT
Excessive cabin altitude warning, XS CAB ALT
Oxygen deploy-OXY DEPLOY
Ambient pressure, PA
Ambient pressure rate of change, PA-DOT
Cabin-to-ambient differential pressure, AP
Excessive cabin-to-ambient differential pressure warning, EX AP.

In some examples, the avionics may also transmit discrete outputs for the XS CAB ALT, EX AP, and OXY DEPLOY signals for the purpose of disabling or enabling functions in the cabin pressure controller (or outflow valve) and the oxygen deploy system (not shown in FIG. 4B). In general, the independent pressure sensor functionality and avionics interface of this disclosure may be independent from the same avionics software that perform cabin pressure commands (computes mode logic and implements the cabin pressure commands and rate limits). This is to achieve certain airplane development assurance (and safety) design goals. For example, this avionics interface of FIG. 4B may instead be output to the crew alert system, e.g., avionics display/crew alert system 112, shown in FIG. 1.

FIG. 4C is a block diagram illustrating an example independent pressure sensor (with PC and PA sensors) configured for smart manual control. In some examples, the manual control panel 116, described above in relation to FIG. 1, may be configured for "smart" manual control. In smart manual control, the pilot may select outflow valve control settings that includes some automated features to reduce the workload of the pilot. In other examples, with standard manual control, the pilot may directly control the outflow valve and watch a pressure indicator, which may consume a large amount of the pilot's attention.

However, for smart manual control, the pilot's CPCS manual control panel may be implemented with a dedicated pressure sensor and electronics and software that may include functionality such as:

- Manual "hold" and/or adjustable manual hold;
- Altitude limit;
- Differential pressure limiting;
- Cabin altitude/pressure sensing and output transmission via data bus; and/or
- Differential pressure sensing and output transmission via data bus.

In some examples, this "smart" functionality of the manual control system, be implemented in a separate processing circuitry, e.g., a smart manual controller. In other examples, the smart functionality may be implemented directly on the outflow valve, e.g., within the electro-mechanical rotary actuator, as described above in relation to FIG. 2.

In some examples, smart functions may include the independent pressure sensor functionality. Similar to implementing the automatic control functionality, including smart features in the manual control may also be subject to customization of control parameters for each aircraft type application. For the distributed CPCS of this disclosure, the smart manual controller may include an interface with avionics to receive application specific "gain terms" for manual control (similar to the above described automatic control).

Because a pressure sensor may be used for the closed-loop control smart manual functionality, an independent pressure sensor, described above, may be integrated into the smart manual control system-still providing the above described sensing functionality. Independent pressure sensor 430, in the example of FIG. 4C may be one possible implementation. Independent pressure sensor 430 is a differential pressure sensor for differential pressure limiting functionality. The additional sensor input for ambient air pressure, PA 432, may be added to the functionality of the Independent Pressure Sensor, so that cabin pressure and cabin-to-ambient differential pressure would be sensed and calculated.

In the example of FIG. 4C, air data information, e.g., via A429 data bus 436 may not be used, because the airplane pressure can be inferred by the following simple calculation: $PA=PC-\Delta P$. The outputs, e.g., via A429 bus 408 and the discrete outputs 410 are the same as described in relation to FIG. 4A.

Figure 5:
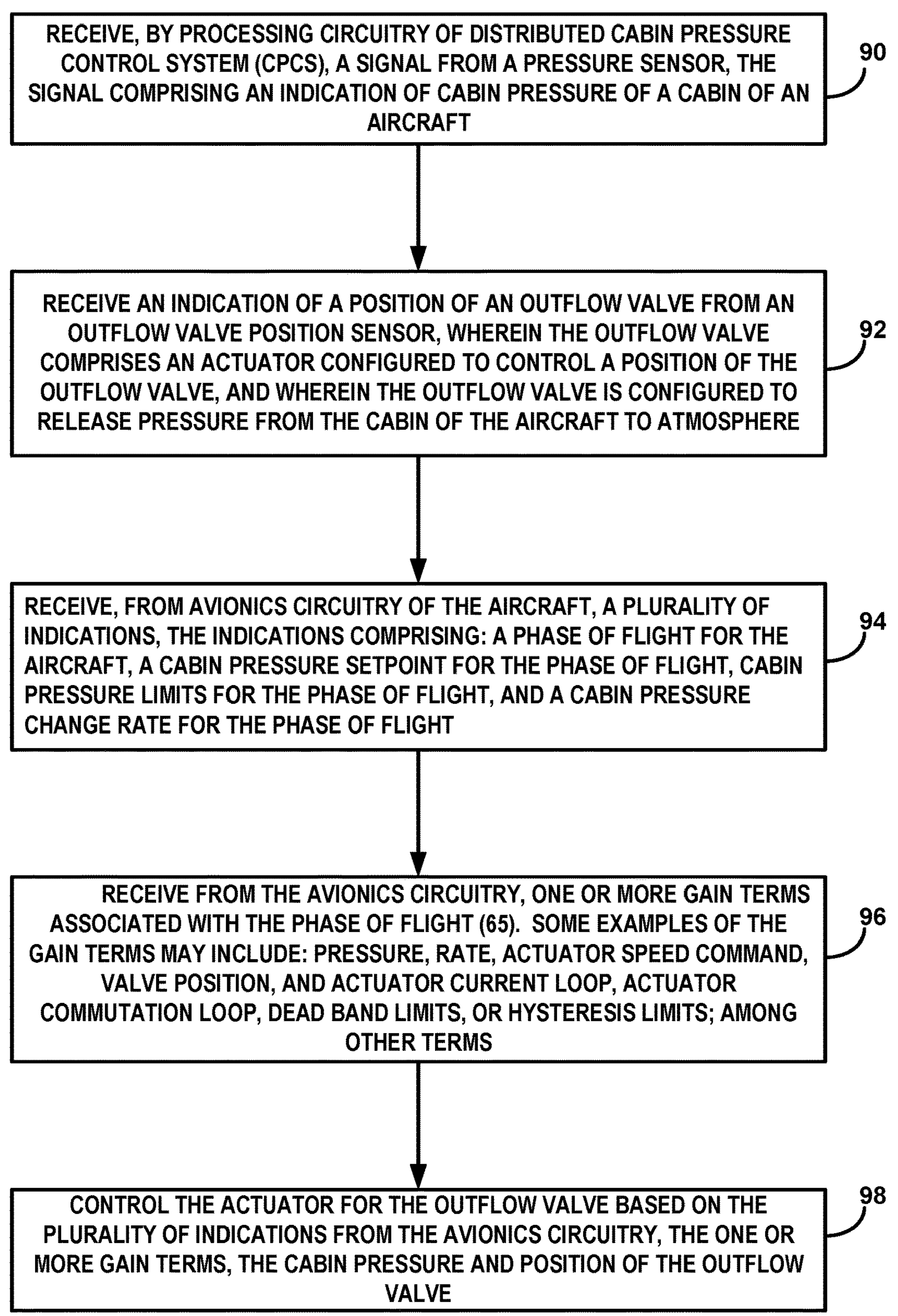
FIG. 5 is a flowchart illustrating an example operation for the distributed CPCS of this disclosure.

FIG. 5 is a flowchart illustrating an example operation for the distributed CPCS of this disclosure. Although most of the description for the distributed CPCS of this disclosure focused on a CPCS architecture with a single outflow valve, e.g., OFV 222 of FIG. 2, the same concepts are fully valid for CPCS architectures that include more than one outflow valve, as well as more than one automatic cabin pressure controller, smart manual controller, independent pressure sensor, and/or pilot control panel.

As described above in relation to FIGS. 1 and 2, by processing circuitry of distributed CPCS, e.g., processing circuitry 250, may receive a signal from a pressure sensor (92), such as pressure sensor input 210 coupled to pressure sensor, Pc. The received signal may include an indication of cabin pressure of a cabin of an aircraft. As described above in relation to FIGS. 4A-4C, the signal may include several other parameters, including pressure rate-of-change.

Processing circuitry 250 may also receive an indication of a position of outflow valve 222 from outflow valve position sensor 223 (92). As described above, the outflow valve may include an actuator, motor 226, that controls a position of outflow valve 222. Outflow valve 222 is configured to release pressure from the cabin of the aircraft to atmosphere to control the cabin pressure for the aircraft.

As described above in relation to FIG. 2, processing circuitry 250, and/or controller 251, may receive from avionics circuitry of the aircraft a set of indications (94). Indications, of the set the indications, may include any one or more of a phase of flight for the aircraft, a cabin pressure setpoint for the phase of flight, cabin pressure limits for the phase of flight, and a cabin pressure change rate for the phase of flight, among other indications.

Similarly, processing circuitry 250, and/or controller 251, may receive from the avionics circuitry, one or more gain terms associated with the phase of flight (96). Some examples of the gain terms may include: pressure, rate, actuator speed command, valve position, and actuator current loop, actuator commutation loop, dead band limits, or hysteresis limits; among other terms. Processing circuitry 250 may control the actuator, motor 226, for the outflow valve based on the plurality of indications from the avionics circuitry, the one or more gain terms, the cabin pressure and position of the outflow valve (98).

The techniques of this disclosure may also be described in the following examples.

Example 1: A system comprising: avionics circuitry configured to be installed on an aircraft; an outflow valve comprising an actuator configured to control a position of the outflow valve, wherein the outflow valve is configured to release pressure from a cabin of the aircraft to atmosphere; a pressure sensor configured to sense air pressure of the cabin; processing circuitry configured to: receive a signal from the pressure sensor comprising cabin pressure of the cabin; receive a position of the outflow valve from an outflow valve position sensor; receive, from the avionics circuitry of the aircraft, a plurality of indications, the indications comprising a phase of flight for the aircraft, a cabin pressure setpoint for the phase of flight, cabin pressure limits for the phase of flight, and a cabin pressure change rate for the phase of flight; receive, from the avionics circuitry, one or more gain terms associated with the phase of flight, wherein the one or more gain terms comprise pressure, rate, actuator speed command, valve position, and one or more of an actuator current loop, actuator commutation loop, dead band limits, or hysteresis limits; and operate the actuator for the outflow valve based on the plurality of indications from the avionics circuitry, the one or more gain terms, the cabin pressure, and the position of the outflow valve.

Example 2. The system of example 1, wherein the phase of flight for the aircraft comprises at least one of: maintenance testing, ground operation, takeoff, climb, cruise, descent, or landing.

Example 3. The system of examples 1 or 2, wherein the pressure sensor is configured to output the signal comprising the cabin pressure both to the processing circuitry and directly to the avionics circuitry.

Example 4. The system of any of examples 1-3, wherein the pressure sensor is a first pressure sensor, the system comprising a second pressure sensor configured to sense air pressure of the cabin, the second pressure sensor configured to output a second signal comprising the cabin pressure directly to the avionics circuitry, wherein the second pressure sensor is independent of the first pressure sensor.

Example 5. The system of any of examples 1-4, wherein the system is configured to be installed into a first aircraft type and to receive first plurality of indications and a first set of gain terms from first avionics circuitry of the first aircraft type; wherein the system is configured to be installed into a second aircraft type and to receive second plurality of indications and a second set of gain terms from second avionics circuitry of the second aircraft type; wherein at least the first set of gain terms differs from the second set of gain terms; wherein the system comprises core hardware and core software; wherein the core hardware and the core software are each configured to be installed in each of the first aircraft type and the second aircraft type.

Example 6. The system of any of examples 1-5, wherein the one or more gain terms further comprises: gains for pressure, rate, motor speed command, valve position, closed-loop control algorithms, dead-bands, hysteresis limits, motor current, and motor commutation settings.

Example 7. The system of any of examples 1-6, wherein the processing circuitry is operatively coupled to a non-volatile memory, wherein the processing circuitry is configured to store the one or more gain terms received from the avionics circuitry at the non-volatile memory; wherein the processing circuitry is configured to receive the one or more gain terms when the avionics circuitry is initialized, wherein the processing circuitry is configured to retrieve the one or more gain terms, as needed, from the non-volatile memory in response to a reset or power cycle of the processing circuitry, without regard to receiving the one or more gain terms a second time from the avionics circuitry.

Example 8. The system of any of examples 1-7, wherein the CPCS comprises at least two valve controllers, wherein each valve controller comprises the processing circuitry, and wherein each valve controller is separately configured to receive and store the one or more gain terms.

Example 9. The system of any of examples 1-8, wherein the avionics circuitry comprise separate and independent modules configured to perform dissimilar functions of the avionics circuitry, wherein at least some modules of the separate and independent modules are configured to share information with other modules of the separate and independent modules; wherein a first module of the separate and independent modules is configured to compute a first indication and a first gain term and output the first indication and first gain term to the CPCS over a first communication channel; wherein a second module of the separate and independent modules is configured to compute a second indication and a second gain term and output the second indication and second gain term to the CPCS over a second communication channel separate from the first communication channel.

Example 10. The system of any of examples 1-9, wherein the modules for the aviation circuitry include at least: crew alert system modules, flight management system modules, input-output modules, processing modules, display modules, pilot touch screen display modules, and air management system (AMS) modules.

Example 11. The system of any of examples 1-10, wherein at least one module of the separate and independent modules are configured to perform safety related functions, wherein the safety related functions comprise one or more of: monitoring of a command and a response to the command, determining whether CPCS operation merits a warning, and outputting the warning to a crew of the aircraft.

Example 12. The system of any of examples 1-11, wherein the at least one module is configured to receive sensor feedback from CPCS specific equipment to perform the safety related functions.

Example 13. An apparatus for distributed cabin pressure control, the apparatus comprising: an outflow valve comprising an actuator configured to control a position of the outflow valve, wherein the outflow valve is configured to release pressure from a cabin of an aircraft to atmosphere; a pressure sensor configured to sense air pressure of the cabin; processing circuitry configured to: receive a signal from the pressure sensor comprising cabin pressure of the cabin; receive a position of the outflow valve from an outflow valve position sensor; receive, from avionics circuitry of the aircraft, a plurality of indications, the indications comprising: a phase of flight for the aircraft, a cabin pressure setpoint for the phase of flight, cabin pressure limits for the phase of flight, and a cabin pressure change rate for the phase of flight; receive, from the avionics circuitry, one or more gain terms associated with the phase of flight, wherein the one or more gain terms comprise: pressure, rate, actuator speed command, valve position, and one or more of an actuator current loop, actuator commutation loop, dead band limits, or hysteresis limits; and operate the actuator for the outflow valve based on the plurality of indications from the avionics circuitry, the one or more gain terms, the cabin pressure and the position of the outflow valve.

Example 14. The apparatus of example 13, wherein the phase of flight for the aircraft comprises at least one of: maintenance testing, ground operation, takeoff, climb, cruise, descent, or landing.

Example 15. The apparatus of examples 13 or 14, wherein the pressure sensor is configured to output the signal comprising the cabin pressure both to the processing circuitry and directly to the avionics circuitry.

Example 16. The apparatus of any of examples 13-15, wherein the apparatus is configured to be installed into a first aircraft type and to receive first plurality of indications and a first set of gain terms from first avionics circuitry of the first aircraft type; wherein the apparatus is configured to be installed into a second aircraft type and to receive second plurality of indications and a second set of gain terms from second avionics circuitry of the second aircraft type; wherein at least the first set of gain terms differs from the second set of gain terms; wherein the apparatus comprises core hardware and core software; wherein the core hardware and the core software are each configured to be installed in each of the first aircraft type and the second aircraft type.

Example 17. The apparatus of any of examples 13-16, wherein the processing circuitry is operatively coupled to a non-volatile memory, wherein the processing circuitry is configured to store the one or more gain terms received from the avionics circuitry at the non-volatile memory; wherein the processing circuitry is configured to receive the one or more gain terms at when the avionics circuitry is initialized, wherein the processing circuitry is configured to retrieve the one or more gain terms, as needed, from the non-volatile memory in response to a reset or power cycle of the CPCS, without regard to receiving the one or more gain terms a second time from the avionics circuitry.

Example 18. The apparatus of any of examples 13-17, wherein the apparatus comprises at least two valve controllers, wherein each valve controller comprises the processing circuitry, and wherein each valve controller is separately configured to receive and store the one or more gain terms.

Example 19. A method comprising: receiving, by processing circuitry of distributed cabin pressure control system (CPCS), a signal from a pressure sensor, the signal comprising an indication of cabin pressure of a cabin of an aircraft; receiving an indication of a position of an outflow valve from an outflow valve position sensor, wherein the outflow valve comprises an actuator configured to control a position of the outflow valve, and wherein the outflow valve is configured to release pressure from the cabin of the aircraft to atmosphere; receiving, from avionics circuitry of the aircraft, a plurality of indications, the indications comprising: a phase of flight for the aircraft, a cabin pressure setpoint for the phase of flight, cabin pressure limits for the phase of flight, and a cabin pressure change rate for the phase of flight; receiving, from the avionics circuitry one or more gain terms associated with the phase of flight, wherein the one or more gain terms comprise one or more of pressure, rate, actuator speed command, valve position, and actuator current loop, actuator commutation loop, dead band limits, or hysteresis limits; and controlling the actuator for the outflow valve based on the plurality of indications from the avionics circuitry, the one or more gain terms, the cabin pressure and position of the outflow valve.

20. The method of example 19, wherein the CPCS is configured to be installed into a first aircraft type and to receive first plurality of indications and a first set of gain terms from first avionics circuitry of the first aircraft type; wherein the CPCS is configured to be installed into a second aircraft type and to receive second plurality of indications and a second set of gain terms from second avionics circuitry of the second aircraft type; wherein at least the first set of gain terms differs from the second set of gain terms; wherein the CPCS comprises core hardware and core software; wherein the core hardware and the core software are each configured to be installed in each of the first aircraft type and the second aircraft type.

In one or more examples, the functions described above may be implemented in hardware, software, firmware, or any combination thereof. For example, the various components of FIGS. 1 and 2, such as FMS 102, AMS 125, controller 251, and processing circuitry 250 and 252 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," "controller," and "processing circuitry," as used herein, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. These and other examples are within the scope of the following claims.

What is claimed is:

1. A system comprising:

avionics circuitry configured to be installed on an aircraft;

an outflow valve comprising an actuator configured to control a position of the outflow valve, wherein the outflow valve is configured to release pressure from a cabin of the aircraft to atmosphere;

a pressure sensor configured to sense air pressure of the cabin;

processing circuitry that is separate from the avionics circuitry and configured to:

receive a signal from the pressure sensor, wherein the signal includes a value indicating the air pressure of the cabin;

receive a position of the outflow valve from an outflow valve position sensor;

receive, from the avionics circuitry of the aircraft, a plurality of indications comprising a phase of flight for the aircraft, a cabin pressure setpoint for the phase of flight, cabin pressure limits for the phase of flight, and a cabin pressure change rate for the phase of flight;

receive, from the avionics circuitry in response to an initialization of the aircraft, one or more gain terms associated with the phase of flight; and perform closed-loop operation of the actuator for the outflow valve according to a control algorithm, wherein inputs to the control algorithm include the plurality of indications from the avionics circuitry, the one or more gain terms, the value indicating the air pressure, and the position of the outflow valve, wherein the one or more gain terms comprise constant values configured to modify how the control algorithm controls the outflow valve to maintain a cabin pressure of the aircraft based on the cabin pressure setpoint for the phase of flight, wherein the one or more gain terms are different than the cabin pressure setpoint.

2. The system of claim 1, wherein the phase of flight for the aircraft comprises at least one of: maintenance testing, ground operation, takeoff, climb, cruise, descent, or landing.

3. The system of claim 1, wherein the pressure sensor is configured to output the signal both to the processing circuitry and directly to the avionics circuitry.

4. The system of claim 1, wherein the pressure sensor is a first pressure sensor, the system comprising a second pressure sensor configured to sense the air pressure of the cabin, the second pressure sensor configured to output a second signal including a second value indicating the air pressure of the cabin directly to the avionics circuitry, wherein the second pressure sensor is independent of the first pressure sensor.

5. The system of claim 1, wherein the system is configured to be installed into a first aircraft type and to receive a first plurality of indications and a first set of gain terms from first avionics circuitry of the first aircraft type;

wherein the system is configured to be installed into a second aircraft type and to receive a second plurality of indications and a second set of gain terms from second avionics circuitry of the second aircraft type;

wherein at least the first set of gain terms differs from the second set of gain terms;

wherein the system comprises core hardware and core software;

wherein the core hardware and the core software are each configured to be installed in each of the first aircraft type and the second aircraft type.

6. The system of claim 1, wherein the processing circuitry is operatively coupled to a non-volatile memory, wherein the processing circuitry is configured to store the one or more gain terms received from the avionics circuitry at the non-volatile memory;

wherein the processing circuitry is configured to retrieve the one or more gain terms, as needed, from the non-volatile memory in response to a reset or power cycle of the processing circuitry, without regard to receiving the one or more gain terms a second time from the avionics circuitry.

7. The system of claim 6, further comprising:

at least two valve controllers, wherein each valve controller comprises the processing circuitry, and wherein each valve controller is separately configured to receive and store the one or more gain terms.

8. The system of claim 1, wherein the avionics circuitry comprises separate and independent modules configured to perform dissimilar functions of the avionics circuitry, wherein at least some modules of the separate and independent modules are configured to share information with other modules of the separate and independent modules;

wherein a first module of the separate and independent modules is configured to compute a first indication and a first gain term and output the first indication and first gain term to the processing circuitry over a first communication channel;

wherein a second module of the separate and independent modules is configured to compute a second indication and a second gain term and output the second indication and second gain term to the processing circuitry over a second communication channel separate from the first communication channel.

9. The system of claim 8, wherein the separate and independent modules include at least: crew alert system modules, flight management system modules, input-output modules, processing modules, display modules, pilot touch screen display modules, and air management system (AMS) modules.

10. The system of claim 1, wherein the initialization of the aircraft comprises a powering on of the aircraft.

11. The system of claim 1, further comprising:

a motor configured to control the outflow valve, wherein the one or more gain terms comprise a constant value configured to adjust an amount of current delivered to the motor.

12. The system of claim 1, further comprising:

a motor configured to control the outflow valve, wherein the one or more gain terms comprise a constant value configured to adjust a speed of the motor.

13. An apparatus for distributed cabin pressure control, the apparatus comprising:

an outflow valve comprising an actuator configured to control a position of the outflow valve, wherein the outflow valve is configured to release pressure from a cabin of an aircraft to atmosphere;

a pressure sensor configured to sense air pressure of the cabin;

processing circuitry configured to:

receive a signal from the pressure sensor, wherein the signal includes a value indicating the air pressure of the cabin;

receive a position of the outflow valve from an outflow valve position sensor;

receive, from avionics circuitry of the aircraft that is separate from the processing circuitry, a plurality of indications, the indications comprising: a phase of flight for the aircraft, a cabin pressure setpoint for the phase of flight, cabin pressure limits for the phase of flight, and a cabin pressure change rate for the phase of flight;

receive, from the avionics circuitry in response to an initialization of the aircraft, one or more gain terms associated with the phase of flight; and perform closed-loop operation of the actuator for the outflow valve according to a control algorithm, wherein inputs to the control algorithm include the plurality of indications from the avionics circuitry, the one or more gain terms, the value indicating the air pressure, and the position of the outflow valve, wherein the one or more gain terms comprise constant values configured to modify how the control algorithm controls the outflow valve to maintain a cabin pressure of the aircraft based on the cabin pressure setpoint for the phase of flight, wherein the one or more gain terms are different than the cabin pressure setpoint.

14. The apparatus of claim 13, wherein the phase of flight for the aircraft comprises at least one of: maintenance testing, ground operation, takeoff, climb, cruise, descent, or landing.

15. The apparatus of claim 13, wherein the pressure sensor is configured to output the signal both to the processing circuitry and directly to the avionics circuitry.

16. The apparatus of claim 13, wherein the apparatus is configured to be installed into a first aircraft type and to receive first plurality of indications and a first set of gain terms from first avionics circuitry of the first aircraft type;

wherein the apparatus is configured to be installed into a second aircraft type and to receive second plurality of indications and a second set of gain terms from second avionics circuitry of the second aircraft type;

wherein at least the first set of gain terms differs from the second set of gain terms;

wherein the apparatus comprises core hardware and core software;

wherein the core hardware and the core software are each configured to be installed in each of the first aircraft type and the second aircraft type.

17. The apparatus of claim 13, wherein the processing circuitry is operatively coupled to a non-volatile memory, wherein the processing circuitry is configured to store the one or more gain terms received from the avionics circuitry at the non-volatile memory.

18. The apparatus of claim 17, wherein the apparatus comprises at least two valve controllers, wherein each valve controller comprises the processing circuitry, and wherein each valve controller is separately configured to receive and store the one or more gain terms.

19. A method comprising:

receiving, by processing circuitry of a distributed cabin pressure control system (CPCS), a signal from a pressure sensor, the signal comprising an indication of cabin pressure of a cabin of an aircraft;

receiving an indication of a position of an outflow valve from an outflow valve position sensor, wherein the outflow valve comprises an actuator configured to control a position of the outflow valve, and wherein the outflow valve is configured to release pressure from the cabin of the aircraft to atmosphere;

receiving, from avionics circuitry of the aircraft that is separate from the processing circuitry, a plurality of indications, the indications comprising: a phase of flight for the aircraft, a cabin pressure setpoint for the phase of flight, cabin pressure limits for the phase of flight, and a cabin pressure change rate for the phase of flight;

receiving, from the avionics circuitry in response to an initialization of the aircraft, one or more gain terms associated with the phase of flight; and performing closed loop control of the actuator for the outflow valve according to a control algorithm, wherein inputs to the control algorithm include the plurality of indications from the avionics circuitry, the one or more gain terms, the cabin pressure and position of the outflow valve, wherein the one or more gain terms comprise constant values configured to modify how the control algorithm controls the outflow valve to maintain a cabin pressure of the aircraft based on the cabin pressure setpoint for the phase of flight, wherein the one or more gain terms are different than the cabin pressure setpoint.

20. The method of claim 19, wherein the CPCS is configured to be installed into a first aircraft type and to receive first plurality of indications and a first set of gain terms from first avionics circuitry of the first aircraft type;

wherein the CPCS is configured to be installed into a second aircraft type and to receive second plurality of indications and a second set of gain terms from second avionics circuitry of the second aircraft type;

wherein at least the first set of gain terms differs from the second set of gain terms;

wherein the CPCS comprises core hardware and core software;

wherein the core hardware and the core software are each configured to be installed in each of the first aircraft type and the second aircraft type.

* * * * *